(12) United States Patent
Paz-Pujalt

(10) Patent No.: US 8,412,602 B2
(45) Date of Patent: Apr. 2, 2013

(54) METHODS FOR SPONSORED PRINTING OF IMAGES WITH PROMOTIONAL MATERIAL AND SYSTEMS THEREOF

(76) Inventor: Gustavo R. Paz-Pujalt, Rochester, NY (US)

( * ) Notice: Subject to any disclaimer, the term of this patent is extended or adjusted under 35 U.S.C. 154(b) by 837 days.

(21) Appl. No.: 12/189,382

(22) Filed: Aug. 11, 2008

(65) Prior Publication Data

US 2009/0061093 A1    Mar. 5, 2009

Related U.S. Application Data

(60) Provisional application No. 60/964,144, filed on Aug. 9, 2007.

(51) Int. Cl.
G06Q 40/00    (2006.01)

(52) U.S. Cl. ............................................. 705/35; 705/14

(58) Field of Classification Search .................... 705/14, 705/35–40
See application file for complete search history.

(56) References Cited

U.S. PATENT DOCUMENTS

| | | | |
|---|---|---|---|
| 5,666,215 A | 9/1997 | Fredlund et al. | |
| 6,157,435 A | 12/2000 | Slater et al. | |
| 6,842,533 B1 | 1/2005 | Patton et al. | |
| 6,972,859 B1 | 12/2005 | Patton et al. | |
| 7,013,288 B1 * | 3/2006 | Reifel et al. | 705/14.1 |
| 7,191,146 B2 | 3/2007 | Wulff et al. | |
| 2007/0066341 A1 * | 3/2007 | Silverbrook et al. | 455/550.1 |

* cited by examiner

Primary Examiner — Thu Thao Havan
(74) Attorney, Agent, or Firm — Joseph M. Noto; Bond Schoeneck & King PLLC

(57) ABSTRACT

A method, computer readable medium and system for sponsored printing of images with promotional material includes identifying at least one of one or more promotional materials for at least one of a one or more images based on at least one criteria. The identified promotional material and the image are provided in a combined format for printing on a media.

16 Claims, 4 Drawing Sheets

METHODS FOR SPONSORED PRINTING OF IMAGES WITH PROMOTIONAL MATERIAL AND SYSTEMS THEREOF

This application claims the benefit of U.S. Provisional Patent Application Ser. No. 60/964,144, filed Aug. 9, 2007, which is hereby incorporated by reference in its entirety.

FIELD OF THE INVENTION

The present invention relates to a methods and system for printing images and, more particularly, to methods for sponsored printing of images with promotional material and systems thereof.

BACKGROUND

Direct marketing continues to grow a rapid pace. As a result, direct marketing advertisers are constantly looking for new methods for making their direct mailings more effective and attractive. Additionally, direct marketing advertisers are looking for ways to more accurately targeting their direct marketing advertisers to consumers more likely to actually buy the product or engage the service. Further, direct marketing advertisers are seeking ways of more effectively measuring the effectiveness of and response to their direct marketing advertisements.

Currently, there are a number of different types of direct marketing advertisements. For example, one form of direct marketing advertisement involves the use of direct mailing. Generally, this type of advertising is effective with a few recipients, but most recipients are annoyed and some actually become alienated from having to deal with this unwanted and unsolicited mail. Other examples of direct marketing advertisement involve the use of pop-up advertisements or mass mailing of internet or web related information. Again these types of advertising are effective with a few recipients, but most recipients are annoyed and some actually become alienated from having to deal with these advertising attempts. Additionally, some intended recipients are able to block these advertisements to prevent even an initial receipt and viewing of the advertising message.

At the same time as direct marketing has grown, digital photography also has and continues to experience substantial growth. Consumers are not only able to capture digital images with an array of different types of cameras, but also with a variety of other devices which now have image capture capabilities, such as mobile phones and other PDAs.

Interestingly, although the volume of digital image capture has and continues to substantially expand, picture takers are not printing these digital images as often as they used to print pictures captured with conventional photographic film. A variety of factors may be influencing this trend, including the perceived high cost obtaining printed pictures of their digital images either at home or through in store or on-line services.

SUMMARY

A method for sponsored printing of images with promotional material in accordance with embodiments of the present invention includes identifying at least one of one or more promotional materials for at least one of a one or more images based on at least one criteria. The identified promotional material and the image are provided in a combined format for printing on a media.

A computer readable medium having stored thereon instructions for sponsored printing of images with promotional material comprising machine executable code in accordance with other embodiments of the present invention includes identifying at least one of one or more promotional materials for at least one of a one or more images based on at least one criteria. The identified promotional material and the image are provided in a combined format for printing on a media.

A sponsored printing system in accordance with other embodiments of the present invention includes an identification system and an image processing system. The identification system identifies at least one of one or more promotional materials for at least one of a one or more images based on at least one criteria. The image processing system provides the identified promotional material and the image in a combined format for printing on a media.

The present invention provides an effective method and system for delivering printed pictures of digital images at a lower cost through the use of sponsored promotional materials. More specifically, with the present invention the consumer is able to receive reduce cost or free printing services of digital images in exchange for the receipt of the digital images in a combined format with the promotional materials. Additionally, with the present invention the promotional materials associated with the printed digital images in the combined format are more effectively targeted to the recipient based on criteria, such as obtained demographics about the recipient or identified content in the digital images to be printed. Further, the present invention is able to include additional targeted promotional materials with the printed versions of the images and promotional material.

DETAILED DESCRIPTION

Figure 1:
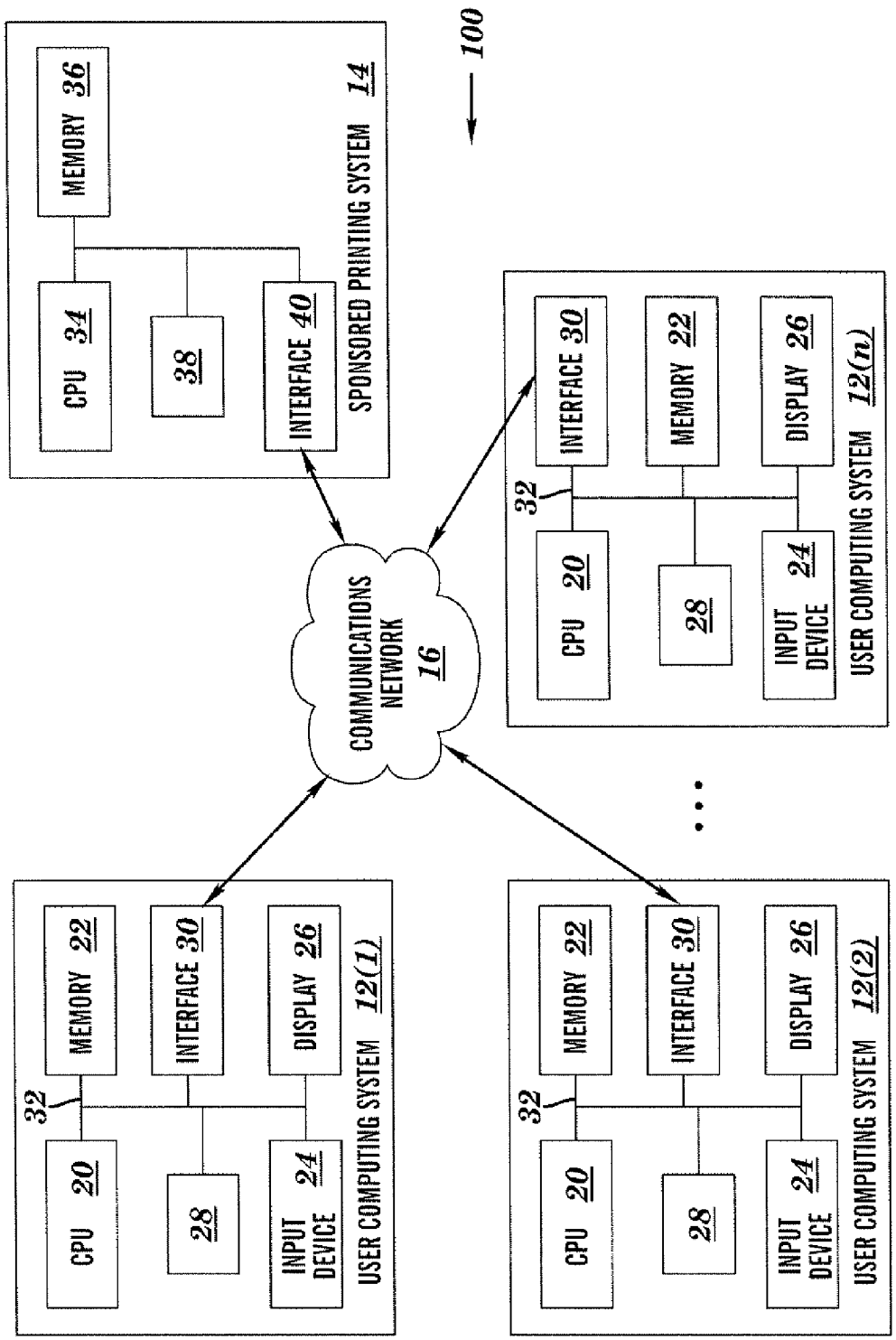
FIG. 1 is a diagram of a system that sponsors printing of images with promotional material in accordance with embodiments of the present invention.

A system 10 that sponsors printing of images with promotional material in accordance with embodiments of the present invention is illustrated in FIG. 1. The system 10 includes a plurality of user computing systems 12(1)-12(n) and a sponsored printing system 14, although the system can include other types and numbers of systems, devices, and components which are configured in other manners. The present invention provides a number of advantages including providing an effective method and system for delivering printed pictures of digital images at a lower cost through the use of sponsored promotional materials.

Referring more specifically to FIG. 1, each of the user computing systems 12(1)-12(n) is used to provide registration and demographic information about each user, transmit one or more images from each user to storage, providing a selection of one or more of the images for printing, and receiving the selected images with associated promotional materials for printing, although other types and numbers of systems could be used and other types and numbers of functions can be performed by the user computing system. Each of the user computing systems 12(1)-12(n) includes a central processing unit (CPU) or processor 20, a memory 22, user input device 24, a display 26, a printing device 28, and an interface system 30, and which are coupled together by a bus 32 or other link, although each of the user computing systems 12(1)-12(n) can include other numbers and types of components, parts, devices, systems, and elements in other configurations. The processor 20 executes a program of stored instructions for one or more aspects of the present invention as described and illustrated herein, although the processor could execute other numbers and types of programmed instructions.

The memory 22 stores these programmed instructions for one or more aspects of the present invention as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to one or more processors, can be used for the memory 22.

The user input device 24 in each of the user computing systems 12(1)-12(n) is used to input selections, such as to input registration and demographic information about each user or to select one or more of the images for printing, although the user input device 24 could be used to input other types of data and interact with other elements. The user input device 24 can include a computer keyboard and a computer mouse, although other types and numbers of user input devices can be used. The display 26 in each of the user computing systems 12(1)-12(n) is used to show data and information to the user, such as the fields for entering registration and demographic data, copies of images stored for the user to select from, or the image and associated promotional material to be printed by way of example only. The display 26 can include a computer display screen, such as a CRT or LCD screen, although other types and numbers of displays could be used. The printing device 28 in each of the user computing systems 12(1)-12(n) can be used to print the selected images and associated promotional material.

The interface system 30 is used to operatively couple and communicate between each of the user computing systems 12(1)-12(n) and the sponsored printing system 14 over a communication network 16, although other types and numbers of communication networks or systems with other types and numbers of connections and configurations to other types and numbers of systems, devices, and components can be used. By way of example only, the communication network 16 can use TCP/IP over Ethernet and industry-standard protocols, including SOAP, XML, LDAP, and SNMP, although other types and numbers of communication networks, such as a direct connection, a local area network, a wide area network, modems and phone lines, e-mail, and wireless communication technology, each having their own communications protocols, can be used.

The sponsored printing system 14 is registers each of the users, stores demographic information for the users, processes the image printing requests, identifies promotional material associated with each image selected for printing and providing each image and the identified promotional material for printing, although the sponsored printing system 14 can perform other types and numbers of functions and there may be other numbers of printing systems. The sponsored printing system 14 includes a central processing unit (CPU) or processor 34, a memory 36, a printing device 38 and an interface system 40 which are coupled together by a bus 40 or other link, although other numbers and types of each of the components and other configurations and locations for the components can be used. The processor 32 executes a program of stored instructions for one or more aspects of the present invention as described herein. The memory 34 stores these programmed instructions for one or more aspects of the present invention as described herein, although some or all of the programmed instructions could be stored and/or executed elsewhere. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to the processor, can be used for the memory in sponsored printing system 14. The printing device 36 can be used to print the selected images and associated promotional material. The interface system 38 is used to operatively couple and communicate between the sponsored printing system 14 and each of the user computing systems 12(1)-12(n), although other types of connections and other types and combinations of systems could be used.

Although embodiments of the user computing systems 12(1)-12(n) and sponsored printing system 14 are described and illustrated herein, the user computing systems 12(1)-12(n) and sponsored printing system 14 can be implemented on any suitable computer system or computing device. It is to be understood that the devices and systems of the embodiments described herein are for exemplary purposes, as many variations of the specific hardware and software used to implement the embodiments are possible, as will be appreciated by those skilled in the relevant art(s).

Furthermore, each of the systems of the embodiments may be conveniently implemented using one or more general purpose computer systems, microprocessors, digital signal processors, and micro-controllers, programmed according to the teachings of the embodiments, as described and illustrated herein, and as will be appreciated by those ordinary skill in the art.

In addition, two or more computing systems or devices can be substituted for any one of the systems in any embodiment of the embodiments. Accordingly, principles and advantages of distributed processing, such as redundancy and replication also can be implemented, as desired, to increase the robustness and performance of the devices and systems of the embodiments. The embodiments may also be implemented on computer system or systems that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The embodiments may also be embodied as a computer readable medium having instructions stored thereon for one or more aspects of the present invention as described and illustrated by way of the embodiments herein, as described herein, which when executed by a processor, cause the processor to carry out the steps necessary to implement the methods of the embodiments, as described and illustrated herein.

Figure 2:
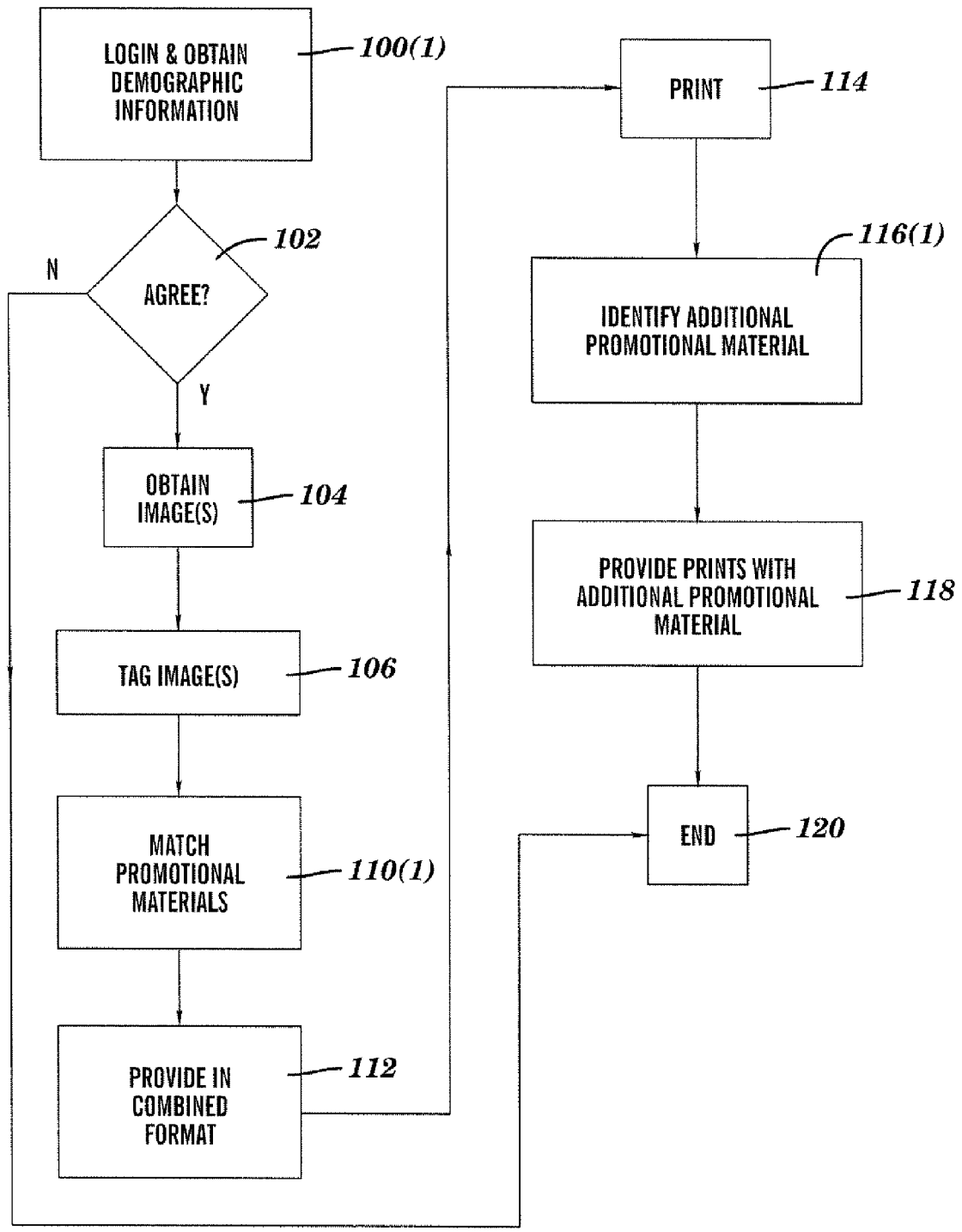
FIG. 2 is a flow chart of a method for sponsored printing of images with promotional material based on obtained demographic information in accordance with embodiments of the present invention.

A method for sponsored printing of images with promotional material in accordance with an exemplary embodiment will now be described with reference to FIGS. 1-2 and 4. Although in this particular example, the processing steps described herein are substantially executed by the sponsored printing system 14 as described below, some or all of these steps can be executed by other systems, devices, or components, such as by one or more of the user computing systems 12(1)-12(n).

In step 100(1), the sponsored printing system 14 obtains log-in and demographic information for a party at one of the user computing systems 12(1)-12(n) inquiring about sponsored printing, although other types and amounts of information can be obtained and in other manners, such as from other systems, components, and databases. If the party at one of the user computing systems 12(1)-12(n) has not registered before, the sponsored printing system 14 can register and obtain the log-in and demographic information from the party at one of the user computing systems 12(1)-12(n) in manners well known to those of ordinary skill in the art. By way of example only, demographic information includes gender, age group, educational level, family size, credit card accounts, and interests, although other types and amounts of information can be obtained. Additionally, the sponsored printing system 14 periodically requests the party at one of the user computing systems 12(1)-12(n) to update the party's demographic profile to capture events, such as a graduation, marriage, birth of a child, or any other life events. Further, by way of example only the sponsored printing system 14 could obtain the demographic information about the party at one of the user computing systems 12(1)-12(n) interrogate one or more public or private databases which containing demographic information for a number of individuals.

In step 102, the sponsored printing system 14 determines whether the party at one of the user computing systems 12(1)-12(n) has agreed to receive either prints of images with promotional material on the same media or images in a combined format with promotional material for printing at no cost to the consumer, although other types and numbers of terms and conditions could be used, such as prints at a reduced cost. For example, as another condition the party at one of the user computing systems 12(1)-12(n) may be required to answer additional questions in exchange for free or sponsored image prints or to agree to have their demographic information shared with one or more other third party systems, such as other marketing services or polling services. If the party at one of the user computing systems 12(1)-12(n) has not agreed, then the No branch is taken to step 120 where this process ends. If the party at one of the user computing systems 12(1)-12(n) has agreed, then the Yes branch is taken to step 104.

In step 104, the sponsored printing system 14 obtains the images the party would either like printed or in a format ready for printing from the one of the user computing systems 12(1)-12(n), although the images can be obtained in other manners and from other sources, such as from memory or from another database or device where images for the party are stored. By way of example only, other sources of images to be selected for prints include image files stored in digital format on floppy disks, Picture CDs, Photo CDs, CD-ROMs, down loaded from the Internet and negatives and prints scanned using a scanner. Additionally, by way of example only, other sources of images to be selected for prints could be automatically operated cameras in kiosks, amusement park rides, aerial, or satellite cameras and image capture devices operated automatically from a remote platform. The obtained images may also contain other data, such as text and graphics by way of example only.

In step 106, the sponsored printing system 14 assigns a tag to each of the obtain images that associates each of the obtained images to the party at one of the user computing systems 12(1)-12(n), although other manners for providing a manner in which to identify the owner of the images can be used.

In step 110(1), the sponsored printing system 14 matches one or more promotional materials from one or more sponsors to each of the obtained images based on the obtained demographic information about the party at one of the user computing systems 12(1)-12(n), although other manners and criteria for matching promotional materials to the images can be used. By way of example only, demographic information indicating interests, such as golf, bicycling, dining out, ethnic restaurants, bilingual services, and travel can be matched by the sponsored printing system 116 with promotional materials which have a corresponding stored designation which matches these interests. Additionally, the sponsored printing system 116 can match sponsored promotional materials based on the demographic information and date or season, although other types and numbers of time periods could be used. By way of example only, if the party's demographic information included an interest in skiing and the current date fell in the winter months then the sponsored printing system 116 would provide one set of promotional materials related to skiing. However, with the same interest in skiing with the current date falling in the summer months, then the sponsored printing system 116 would provide one set of promotional materials related to one or more summer activities usually enjoyed by skiers, such as biking. Further, the sponsored printing system 14 can maintain a history of past matches and also of any received and stored data about purchasing habits, such as if the promotional material is a coupon with an identification code that was tracked for use, to further refine identifying matches and the appropriate promotional material to provide. Even further, the sponsored printing system 14 can prompt the party at one of the user computing systems 12(1)-12(n) with inquiries and obtain requests from the party for specific types of promotional materials to provide eve more targeted advertising.

In step 112, the sponsored printing system 14 combines each of the obtained images with the promotional material matched to each of the images into a format which is then suitable for printing, although the obtained images and matching promotional materials can be combined in other manners. The sponsored printing system 14 provides the combined format to the party at one of the user computing systems 12(1)-12(n) and requests feedback. Based on the received feedback, the sponsored printing system 14 determines whether other types of promotional material should be associated with the image. In this way, the sponsored printing system 14 can provide targeted advertising to an even more likely consumer of the advertised good or service, although other manners for providing more targeted marketing can be used.

In step 114, the sponsored printing system 14 prints each of the obtained images with the promotional material matched to each of the images on the same media, although the printing can be conducted in other manners and by other systems in other locations. In these embodiments, the media comprises photographic printing paper, although other types of media can be used. By way of example only, the media also can comprise conventional paper, cardboard, packaging materials, polymeric substrates, printing plates, metal plates, textiles, manufactured textiles like clothing, linens, curtains, towels, signage, posters, paper flatware, and paper cups. One example of the resulting printed media 200 is illustrated in FIG. 4 with the image 202 and promotional material 204 on one surface of the media and on opposing sides of a perforation 206. Although in these embodiments, obtained images with the promotional material matched to each of the images are printed by the sponsored printing system 14, other systems, such as the one of the user computing systems 12(1)-12(n) at which the party is located could be used for this printing. Additionally, the one of the user computing systems 12(1)-12(n) at which the party is located could already have been provided with media with preprinted advertisements previously matched to the party based on the obtained demographics which are tagged or otherwise identified to only allow the images for that party to be printed at the one of the user computing systems 12(1)-12(n) if the media with the correct tag is used.

In step 116(1), the sponsored printing system 14 identifies other promotional material to include with the printed images based on the obtained demographic information about the party at one of the user computing systems 12(1)-12(n), although other manners and criteria for identifying additional promotional material can be used. By way of example only, based on interests identified in the demographic information about the party at one of the user computing systems 12(1)-12(n) relating to golf, bicycling, ethnic restaurants, bilingual services, and South American travel, the sponsored printing system 14 could identify additional promotional material relating to golf equipment, bicycle gear, ethnic restaurant dining coupons, language service companies, and flight specials to South America. Additionally, based on the demographic information about the party at one of the user computing systems 12(1)-12(n), the sponsored printing system 14 could determine and adjust all of the text in the promotional materials to a particular language, such as English, Chinese, Japanese, Korean, Arabic, Cyrillic, or Greek by way of example only. As a result, these promotional materials will be more effective in the native or desired language of the party receiving the materials. Once the sponsored printing system 14 has identified the other promotional material to include with the printed images, the sponsored printing system 14 prints the additional promotional material on the additional media, although other manners for producing or otherwise obtaining the additional promotional material can be used.

Figure 4:
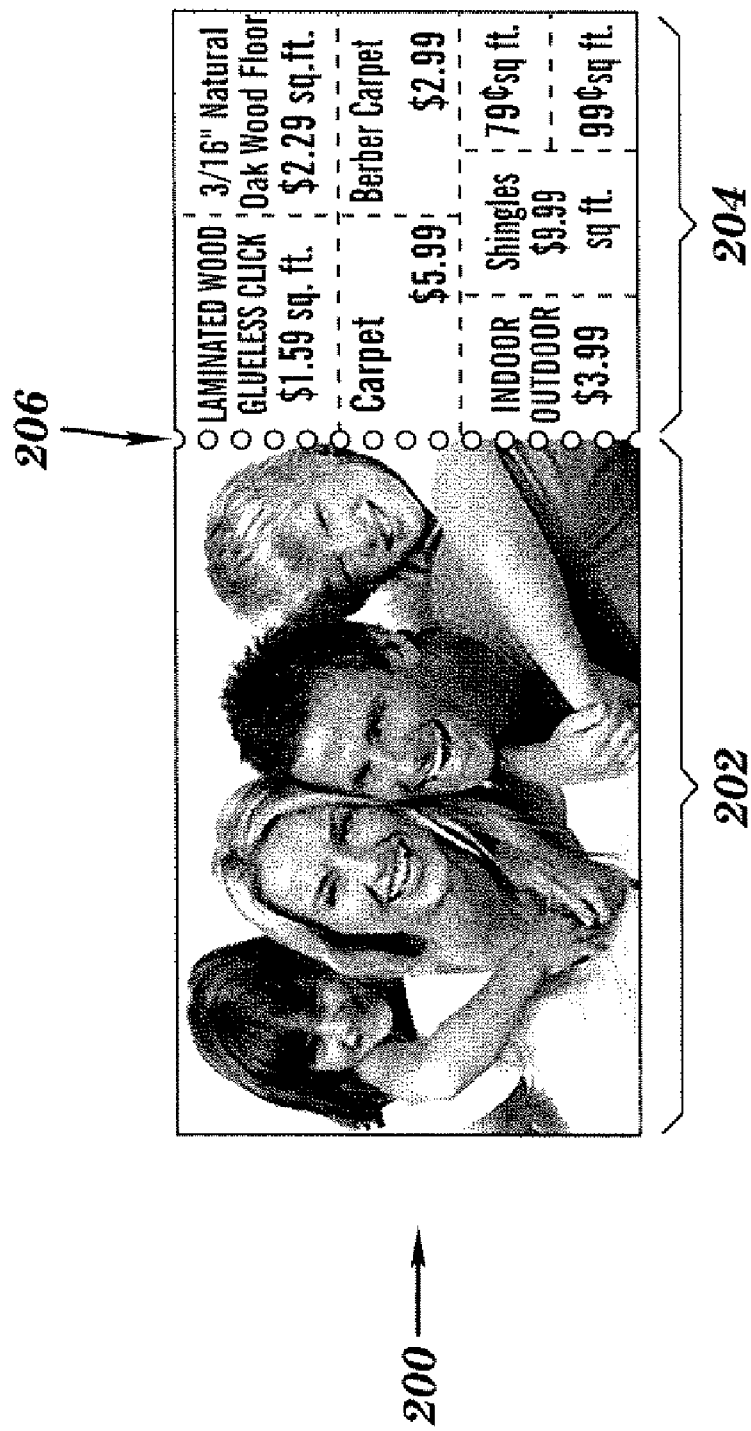
FIG. 4 is a diagram of an example of printed media with a combined format of an image and promotional material.

In step 118, the sponsored printing system 14 provides the media which contains the printed combined format of each of the images with the associated promotional material, as illustrated by way of example only in FIG. 4, along with additional media with the identified additional promotional material to the party that was at the one of the user computing systems 12(1)-12(n). By way example only, the printed media which contains the combined format of each of the images with the associated promotional material and the additional printed media with the additional promotional material from different service providers or vendors are "married" or combined into the same envelope and sent to the party who was at the one of the user computing systems 12(1)-12(n). Next, in step 120 this process ends.

Figure 3:
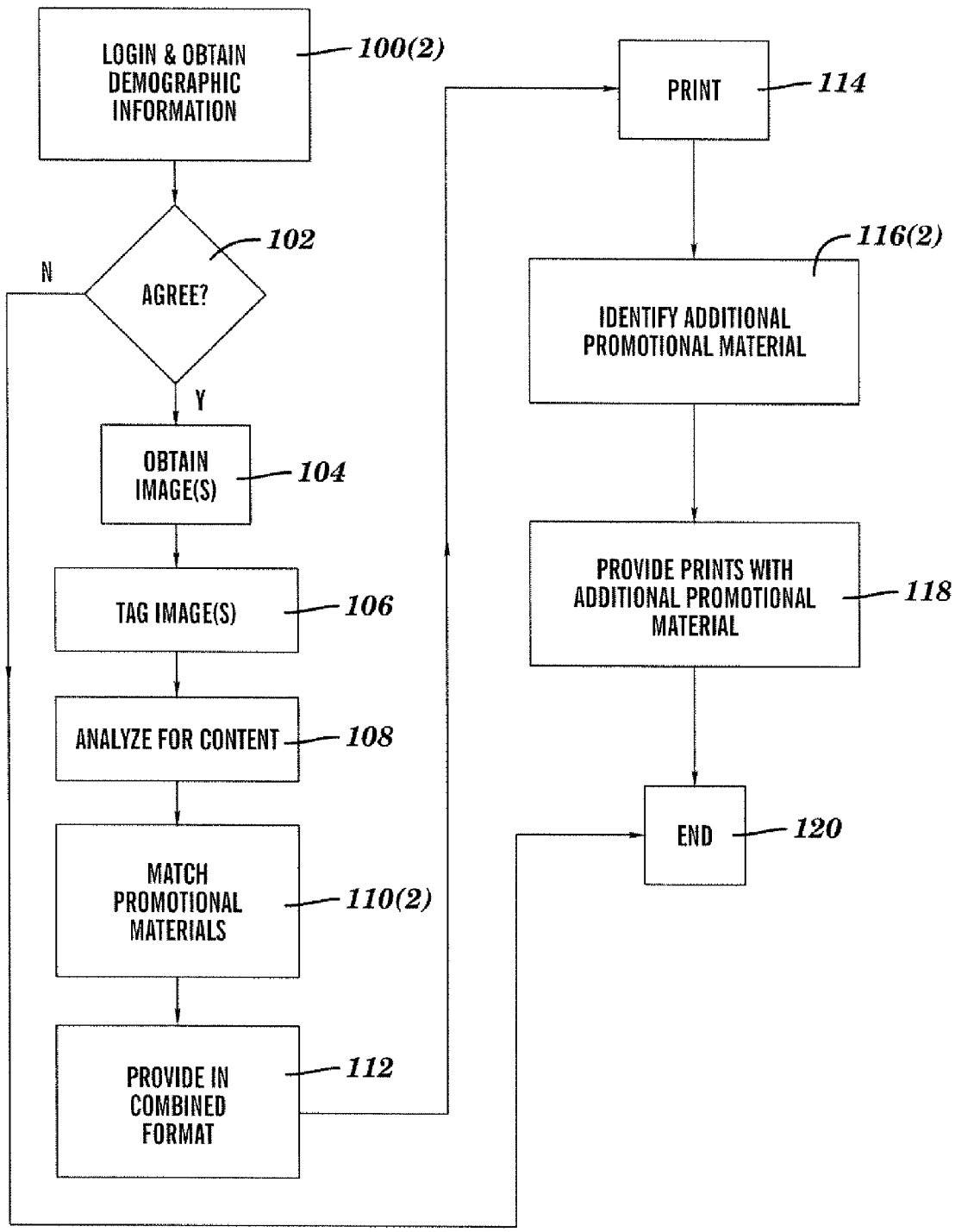
FIG. 3 is a flow chart of a method for sponsored printing of images with promotional material based on analysis of the images in accordance with embodiments of the present invention.

Another method for sponsored printing of images with promotional material in accordance with an exemplary embodiment will now be described with reference to FIGS. 1 and 3-4. The method illustrated and described with reference to FIGS. 1-2 and 4 is identical to the method illustrated and described herein with reference to FIGS. 1 and 3-4. Steps in the embodiment of the method described with reference to FIGS. 1 and 3-4 which are like those in the embodiment of the method described with reference to FIGS. 1-2 and 4 will have like numbers and will not be described again here. Although in this particular example, the processing steps described herein are substantially executed by the sponsored printing system 14 as described below, some or all of these steps can be executed by other systems, devices, or components, such as by one or more of the user computing systems 12(1)-12(n).

In step 100(2), the sponsored printing system 14 obtains log-in information for a party at one of the user computing systems 12(1)-12(n) inquiring about sponsored printing, although other types and amounts of information can be obtained and in other manners, such as from other systems, components, and databases. If the party at one of the user computing systems 12(1)-12(n) has not registered before, the sponsored printing system 14 can register and obtain the log-in information from the party at one of the user computing systems 12(1)-12(n) in manners well known to those of ordinary skill in the art.

In step 108, the sponsored printing system 14 scans and identifies content in the obtained images which is used to identify promotional material, although other types and amounts of information to identify promotional material can be used and the images can be analyzed in other manners. More specifically, the sponsored printing system 14 uses an object recognition system to identify key features within the obtained images and to connect information derived herein to the types of promotional materials or ads to be printed or presented to the users or recipients, although other manners for identifying content and matching promotional materials can be used. By way of example only, the object detection system in the sponsored printing system 14 may detect automobiles in the images which can then be used to match automotive related promotional materials to the party at one of the user computing systems 12(1)-12(n).

In step 110(2), the sponsored printing system 14 matches one or more promotional materials from one or more sponsors to each of the obtained images based on the obtained content in the images, although other manners and criteria for matching promotional materials to the images can be used. By way of example only, the obtained content may illustrate golf clubs in the images which the sponsored printing system 116 may match with golfing related promotional materials to these images.

In step 116(2), the sponsored printing system 14 identifies other promotional material to include with the print images based on the obtained content from the scanned images, although other manners and criteria for identifying additional promotional material can be used. The sponsored printing system 14 prints the additional promotional material on additional media, although the additional promotional material can be obtained in other manners.

Accordingly, as illustrated and described herein the present invention provides a number of advantages including providing an effective method and system for delivering printed pictures of digital images at a lower cost through the use of sponsored promotional materials.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefor, is not intended to limit the claimed processes to any order except as may be specified in the claims. Accordingly, the invention is limited only by the following claims and equivalents thereto.

What is claimed is:

1. A computer readable medium having stored thereon instructions for sponsored printing of consumer generated images with promotional material comprising machine executable code which when executed by at least one processor, causes the processor to perform steps comprising:
   recognizing a consumer request for sponsored printing of at least one consumer generated image, wherein the consumer generated image is selected by the consumer from one or more stored consumer generated images;
   storing demographic information about the consumer provided by the consumer;
   matching an advertiser to the consumer based upon the demographic information;
   identifying promotional material of the matched advertiser for the at least one consumer generated image by associating the promotional material with the image based on, matching at least part of the content of the image with the content of the promotional material identified;
   providing the identified promotional material and the selected image in a combined format for sponsored printing on a media;
   printing the identified promotional material and the selected image in the combined format on the media; and
   providing the consumer with printed pictures of the selected image together with the identified promotional material at reduced or no cost to the consumer.

2. The medium as set forth in claim 1 further comprising providing a perforation in the media, wherein the identified promotional material and the selected image are on opposing sides of the perforation.

3. The medium as set forth in claim 1 further comprising:
   identifying at least one other promotional material for at least one of the selected consumer generated images based on at least part of the content of the image;
   printing the at least one other promotional material on other media; and
   providing the printed media with the identified promotional material and the selected consumer generated image in a combined format and the printed other media with the at least one other promotional material to the consumer at reduced or no cost to the consumer.

4. The medium as set forth in claim 1 wherein associating the promotional material comprises scanning and identifying content in the selected consumer generated image using an object recognition system which identifies key features within the image to match to related content of the promotional material.

5. The medium as set forth in claim 1 wherein said sponsored printing comprises receiving the selected image and identified promotional material for printing at no cost to the consumer in exchange for the combined format.

6. A sponsored printing system comprising:
   a user input device that inputs consumer registration in a sponsored printing program, demographic information about the registered consumer, a consumer request for sponsored printing of at least one consumer generated image, consumer generated images, sponsor registration in the sponsored printing program, and sponsor promotional materials;
   an identification system that matches a sponsor to the consumer based upon the demographic information and identifies sponsor promotional material for at least one selected consumer generated image, by associating the promotional material with the selected consumer generated image based on matching at least part of the content of the consumer generated image with the content of the promotional material identified, and comprises a storage system that stores consumer generated images and a selection system that receives a selection by the consumer of at least one consumer generated image from the stored consumer generated images;
   and
   an image processing system that provides the identified promotional material and the selected consumer generated image in a combined format for sponsored printing on a media that prints the identified promotional material and the selected image in the combined format on the media at reduced or no cost to the consumer.

7. The system as set forth in claim 6 wherein the printing system provides a perforation in the media, wherein the identified promotional material and the selected image are printed on opposing sides of the perforation.

8. The system as set forth in claim 6 wherein the identification system identifies at least one other promotional material for at least one of the selected consumer generated images based on at least part of the content of the image, the printing system prints the at least one other promotional material on other media, and the image processing system provides the media with the identified promotional material and the selected consumer generated image in a combined format and the printed other media with the at least one other promotional material to the consumer at reduced or no cost to the consumer.

9. The system as set forth in claim 6 wherein the identification system further comprises an object recognition system which identifies key features within the selected consumer generated image that match to related content of the promotional material by scanning and identifying content in the selected image.

10. The system as set forth in claim 6 wherein the selection system receives a selection of at least obtaining the selected image and identified promotional material in a format for printing at no cost to the consumer in exchange for the combined format.

11. A sponsored printing system comprising:
    an information processing system that recognizes a consumer request for sponsored printing of at least one selected consumer generated image and receives demographic information about the consumer provided by the consumer;
    a storage processing system that stores one or more consumer generated images and processes a selection of at least one of the one or more stored consumer generated images;
    a matching system that matches an advertiser sponsor of the printing of the at least one selected image to the consumer based upon the demographic information, and matches promotional materials with the at least one selected image based on at least one criteria, wherein at least part of the content of the selected image is used to match the type of promotional material identified, wherein the matching system comprises an object recognition system which identifies key features within the selected image that match to the promotional materials by scanning and identifying content in the selected image, the matching system matches at least one other of the one or more promotional materials with at least one of one or more selected images based on the at least one criteria;
    an image processing system that combines the matched promotional material and the selected consumer generated image in the combined format on media and the at least one other matched one or more promotional materials on other media; and a distribution system that provides the media with the matched promotional material and the selected consumer generated image in a combined format together with the other media with the at least one other matched one or more promotional materials;

a selection processing system that processes a selection of at least obtaining the selected image and identified promotional material in a format for printing; and a perforation system that perforates the media, wherein the image processing system prints the promotional material and the selected image on opposing sides of the perforation at reduced or no cost to the consumer in exchange for the combined format.

12. A method for the sponsored printing of images with promotional material, the method comprising:

recognizing a consumer request for sponsored printing of at least one selected consumer generated image, wherein the consumer generated image is selected by the consumer from one or more stored consumer generated images;

storing demographic information about the consumer provided by the consumer;

matching an advertiser to the consumer based upon the demographic information;

identifying promotional material of the matched advertiser for the selected image by associating the promotional material with the image based on matching at least part of the content of the image with the content of the promotional material identified;

providing the identified promotional material and the selected image in a combined format for sponsored printing on a media;

printing the identified promotional material and the selected image in the combined format on the media; and providing the consumer with printed pictures of the selected image together with the identified promotional material at reduced or no cost to the consumer.

13. The method as set forth in claim 12 further comprising providing a perforation in the media, wherein the identified promotional material and the selected image are on opposing sides of the perforation.

14. The method as set forth in claim 12 further comprising:

identifying at least one other promotional material for the selected image based on at least part of the content of the image;

printing the at least one other promotional material on other media; and providing the printed media with the identified promotional material and the selected image in a combined format and the printed other media with the at least one other promotional material to the consumer at reduced or no cost to the consumer.

15. The method as set forth in claim 12 wherein associating the promotional material comprises scanning and identifying content in the selected image using an object recognition system which identifies key features within the image to match to related content of the promotional material.

16. The method as set forth in claim 12 wherein said sponsored printing comprises receiving the selected image and identified promotional material for printing at no cost to the consumer in exchange for the combined format.

* * * * *